(12) United States Patent
Schorr et al.

(10) Patent No.: US 8,409,344 B2
(45) Date of Patent: Apr. 2, 2013

(54) CEMENT AND METHODS OF PREPARING CEMENT

(75) Inventors: Richard J. Schorr, Westerville, OH (US); Suvankar Sengupta, Hilliard, OH (US); Richard L. Helferich, Clayton, OH (US); Gary M. Gordon, Plain City, OH (US); Debabrata Rautaray, Pune (IN)

(73) Assignee: MetaMateria Technologies LLC, Columbus, OH (US)

( * ) Notice: Subject to any disclaimer, the term of this patent is extended or adjusted under 35 U.S.C. 154(b) by 88 days.

(21) Appl. No.: 12/528,753

(22) PCT Filed: Feb. 26, 2008

(86) PCT No.: PCT/US2008/055033
§ 371 (c)(1),
(2), (4) Date: Mar. 12, 2010

(87) PCT Pub. No.: WO2008/106461
PCT Pub. Date: Sep. 4, 2008

(65) Prior Publication Data
US 2010/0175588 A1    Jul. 15, 2010

Related U.S. Application Data

(60) Provisional application No. 60/891,663, filed on Feb. 26, 2007.

(51) Int. Cl.
| | |
|---|---|
| C04B 35/00 | (2006.01) |
| C04B 7/32 | (2006.01) |
| C04B 7/36 | (2006.01) |
| C04B 9/11 | (2006.01) |
| C04B 11/28 | (2006.01) |
| C04B 28/06 | (2006.01) |
| C04B 14/00 | (2006.01) |
| C04B 18/06 | (2006.01) |
| C04B 7/00 | (2006.01) |
| C04B 9/12 | (2006.01) |
| C04B 28/00 | (2006.01) |
| C04B 9/04 | (2006.01) |
| C04B 11/00 | (2006.01) |
| C04B 5/00 | (2006.01) |
| C04B 7/14 | (2006.01) |
| C04B 28/14 | (2006.01) |
| C09K 3/00 | (2006.01) |
| C09B 63/00 | (2006.01) |

(52) U.S. Cl. ........ 106/695; 106/313; 106/402; 106/692; 106/707; 106/790; 106/784; 106/713; 106/811

(58) Field of Classification Search .................... 106/758
See application file for complete search history.

(56) References Cited

U.S. PATENT DOCUMENTS 4,022,629 A * 5/1977 Garrett et al. ................. 106/757
5,127,473 A * 7/1992 Harris et al. .................. 166/277

OTHER PUBLICATIONS

Michaelis, Leonor. The Dynamics of Surfaces. E. & F. N. Spon. p. 24.*

Primary Examiner — Anthony J Green
Assistant Examiner — Karam Hijji
(74) Attorney, Agent, or Firm — Mueller Law, LLC; Jerry K. Mueller, Jr.

(57) ABSTRACT

Cement compositions and methods for making cement compositions are provided. The cement compositions can comprise at least one oxide having a particle size of less than about 600 nm. The methods for making cement may include: providing a mixture of compounds containing the required calcium, silicon, aluminum, and iron to provide at least one of tricalcium silicate, dicalcium silicate, tricalcium aluminate, tetracalcium aluminoferrite, other calcium silicates, aluminates, ferrites, and silicates or combinations thereof; adding a fuel source and an oxidizer to the mixture of compounds; and heating the mixture of compounds, the fuel source, and the oxidizer such that the mixture of compounds, the fuel source, and the oxidizer ignite to form the at least one tricalcium silicate, dicalcium silicate, tricalcium aluminate, and tetracalcium aluminoferrite, or combinations thereof.

7 Claims, 6 Drawing Sheets

CEMENT AND METHODS OF PREPARING CEMENT

CROSS-REFERENCE TO RELATED APPLICATIONS

This application claims priority to and any other benefit of U.S. Provisional Application Ser. No. 60/891,663, filed Feb. 26, 2007, the disclosure of which is incorporated herein by reference in its entirety.

BACKGROUND

Ordinary Portland Cement is one of the basic binder ingredients of concrete and mortar and is a controlled chemical combination of compounds made from calcium, silicon, aluminum, and iron oxides, along with small amounts of other materials. These compounds are typically formed using naturally occurring materials. Ordinary Portland Cement may have four primary phases: tricalcium silicate ("$C_3S$") ($Ca_3SiO_5$); dicalcium silicate ("$C_2S$") ($Ca_2SiO_4$); tricalcium aluminate ("$C_3A$") ($Ca_3Al_2O_6$); and tetracalcium aluminoferrite ("$C_4AF$") ($Ca_4Al_2Fe_2O_{10}$). Other cementitious materials may also be used as one of the basic binder ingredients of concrete and mortar.

The raw materials used to produce cement may be limestone, clay, shale, sand, or iron ore. The current manufacturing process may consist of proportioning the raw materials to the correct chemical composition and grinding them to a fine consistency. The ground material is then fed to a rotary kiln, which is a large cylindrical continuously rotating furnace, and heated in the 1500 to 1600° C. range. The raw materials are calcined, become partially molten, and react to form the four complex compounds shown above. These compounds exit the kiln as a hard, sintered agglomerate form called "clinker." The clinker is cooled, mixed with approximately 5% gypsum, and ground into its final powder form. Gypsum (calcium sulfate, $CaSO_4.2H_2O$) is a necessary additive that helps regulate the setting time of concrete and in this respect becomes the fifth major ingredient of cement. Without the inclusion of gypsum, the hydration rate of the calcium aluminate phase, $C_3A$, is too fast and would not allow enough time to "work" or "place" a concrete mixture before setting. An exemplary preparation process in shown in FIG. 1.

The chemical composition of cement is what distinguishes one type from another. Typical ASTM Type I Portland cement comprises approximately the following percents by weight: 50% $C_3S$, 25% $C_2S$, 10% $C_3A$, 10% $C_4AF$, and 5% gypsum. However, the industry usually identifies the cement by the amount of oxides in the raw materials, such as lime (CaO) and silica ($SiO_2$). Lime and silica make up about 85% by mass of the final product. When the four primary cement phases are listed as basic oxides Ordinary Portland Cement approximately comprises the following percents by weight: 64% CaO, 22% $SiO_2$, 6% $Al_2O_3$, and 3% $Fe_2O_3$.

Concrete is produced by mixing cement with fine aggregate (sand), coarse aggregate (crushed stone), water, and possibly small amounts of additives to alter the properties. For example, a concrete mix may contain the following by weight: about 12% Portland cement, about 34% sand, about 48% crushed stone, and about 6% water. The setting and rate of strength development of concrete can be varied by the use of alternate cement compositions as designated by ASTM. Compositions for the major 5 types of ASTM Portland cement are shown in Table 1. In addition to the composition shown for each type of Portland cement, the mixture also contains an additional 5-7% ground gypsum.

Mortar, on the other hand, is the binder material used to both fill the gaps and to bond between "blocks" used in construction. These blocks may be stone, brick, cinder block, manufactured concrete shapes, etc. The primary ingredient in mortar is the same Portland cement used in concrete. Mortar is essentially a mixture of sand, Portland cement (sometimes with and/or without lime), and water. It is applied as a paste which then sets hard in a similar fashion as concrete. Mortar is literally the glue that holds the wall system together. It can also be used to fix masonry when the original mortar has been washed away. Even though mortar makes up as little as 7% of the total volume of a masonry wall, it plays a crucial role in the performance of the structure. It not only bonds the individual units together, but it also seals the building against moisture and air penetration. While compression strength and durability are critical properties of concrete, bond strength and durability are the critical properties of mortar.

When water is added to cement, each of the compounds undergoes a hydration reaction that forms the cementatious gel that surrounds and holds or binds the additional aggregate materials together and to form a strong solid. Each of the primary phases contributes to the overall physical and chemical characteristics of the final cementatious product.

TABLE 1

Ordinary Portland Cement Compositions and Rate of Strength Development

| ASTM Type | | Composition | | | | Compressive Strength as % of Type I Cement | | |
| --- | --- | --- | --- | --- | --- | --- | --- | --- |
| ASTM Designation | | $C_3S$ | $C_2S$ | $C_3A$ | $C_4AF$ | 1 Day | 2 Days | 28 Days |
| I | General Purpose | 50 | 24 | 11 | 8 | 100 | 100 | 100 |
| II | Moderate Heat and Sulfate Resistance | 42 | 33 | 5 | 13 | 75 | 85 | 90 |
| III | High Early Strength | 60 | 13 | 9 | 8 | 190 | 120 | 110 |
| IV | Low Heat | 26 | 50 | 5 | 12 | 55 | 55 | 75 |
| V | Sulfate Resisting | 40 | 40 | 4 | 9 | 65 | 75 | 85 |

A significant amount of energy is required to manufacture traditional cement. For example, in the US, plants required an average of about 5.0 MMBtu/tonne of cement manufactured with the most energy efficient plant requiring about 3.2 MMBtu/tonne. The average rotary kiln operation uses about 93% of the total energy, with clinker grinding requiring approximately 5%. In addition, the rotary kilns may operate at only 34% energy efficiency. Another downside to the current cement manufacturing process is the exhaustion of $CO_2$ emissions. For every tonne of cement produced in a rotary kiln, approximately 1 tonne of $CO_2$ is released to the atmosphere from the $CO_2$ content of the starting limestone and in the combustion of fossil fuel that provides the heat needed for clinker production.

Thus, there remains a need in the art for more energy efficient methods of producing cement. Additionally, there remains a need in the art for cement compositions that can provide concrete exhibiting improved properties.

SUMMARY

In accordance with embodiments of the present invention, cement compositions are provided. The cement compositions comprise at least one oxide having a particle size of less than about 600 nm. The at least one oxide is selected from tricalcium silicate, dicalcium silicate, tricalcium aluminate, and tetracalcium aluminoferrite, other calcium silicates, aluminates, ferrites, silicates or combinations thereof. The at least one oxide is made by providing a mixture of compounds containing the required calcium, silicon, aluminum, and iron for the at least one oxide, providing a fuel source and an oxidizer to the mixture of compounds; and heating the mixture of compounds, the fuel source, and the oxidizer such that the mixture of compounds, the fuel source, and the oxidizer ignite to form the at least one oxide.

In accordance with other embodiments of the present invention, methods for making cement compositions are provided. The methods comprise: providing a mixture of compounds containing the required calcium, silicon, aluminum, and iron to provide at least one of tricalcium silicate, dicalcium silicate, tricalcium aluminate, tetracalcium aluminoferrite, other calcium silicates, aluminates, ferrites, and silicates or combinations thereof; adding a fuel source and an oxidizer to the mixture of compounds; and heating the mixture of compounds, the fuel source, and the oxidizer such that the mixture of compounds, the fuel source, and the oxidizer ignite to form the at least one tricalcium silicate, dicalcium silicate, tricalcium aluminate, and tetracalcium aluminoferrite, or combinations thereof, wherein the at least one tricalcium silicate, dicalcium silicate, tricalcium aluminate, tetracalcium aluminoferrite, other calcium silicates, aluminates, ferrites, and silicates, or combinations thereof each have a particle size of less than about 600 nm.

It will be understood that other embodiments are also described herein.

BRIEF DESCRIPTION OF THE SEVERAL VIEWS OF THE DRAWINGS

The following detailed description of embodiments of the present invention can be best understood when read in conjunction with the following drawings, where like structure is indicated with like reference numerals and in which.

DETAILED DESCRIPTION OF EMBODIMENTS OF THE INVENTION

Figure 1:
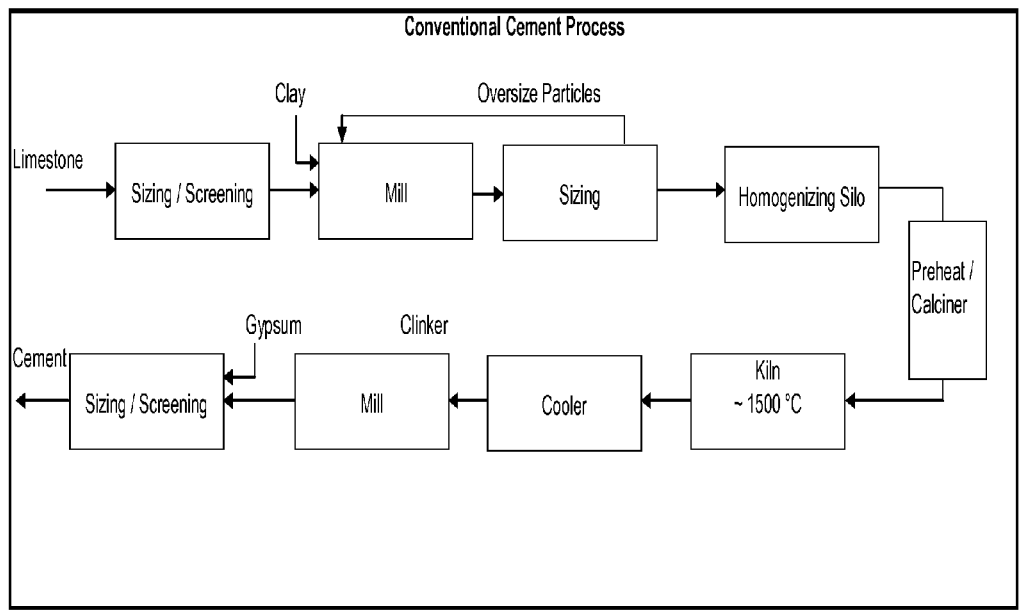
FIG. 1 is a schematic illustration of one method of preparing Ordinary Portland Cement.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, cement compositions and methods of making cement are provided. The cement compositions include one or more oxides having an average particle size of less than about 600 nm.

In some embodiments, cement compositions are provided. The cement compositions comprise at least one oxide having an average particle size of less than about 600 nm. The at least one oxide is selected from tricalcium silicate, dicalcium silicate, tricalcium aluminate, tetracalcium aluminoferrite, other calcium silicates, aluminates, ferrites, and silicon oxide or combinations thereof.

The at least one oxide may be made in any suitable manner. In some embodiments, the at least one oxide is made by providing a mixture of compounds containing the required calcium, silicon, aluminum, and iron for the at least one oxide, providing a fuel source and an oxidizer to the mixture of compounds, and heating the mixture of compounds, the fuel source and the oxidizer such that the mixture of compounds and the fuel source and oxidizer all ignite to form the at least one oxide. In some examples, the mixture of compounds, the fuel source, and the oxidizer are heated such that the mixture of compounds, the fuel source, and the oxidizer foams and subsequently ignites. In other examples, the mixture of compounds and/or the fuel source and/or the oxidizer are heated to remove water and subsequently allowed to gel before the step of heating to ignition.

It will be understood that the mixture of compounds may be provided in any suitable manner. For example, the calcium, silicon, aluminum, and iron containing compounds may be provided in any suitable ratio to provide a desired final product. For example, the mixture of compounds can be chosen to provide one of the oxides, more than one of the oxides, or all of the oxides. In some examples, the oxides may be made separately and subsequently combined to form the cement compositions. In other examples, the oxides may be made simultaneously to form the cement compositions.

In further examples, the mixture of compounds may be in any suitable form. For example, reagent grade compounds including, but not limited to, calcium carbonate, a silica source, aluminum nitrate, and iron nitrate may be used in the mixture of compounds. Additionally, the compounds may be provided in any suitable form. For example, the compounds may comprise hydrates, carbonates, and/or nitrates. In other examples, non-reagent grade materials or naturally occurring materials including, but not limited to, limestone, clay, silica fume, and fly ash blast furnace slag, and iron oxide from iron/steel processing may be used. In yet further examples, waste oxides, such as calcium hydroxide and/or calcium oxide may be used from waste sources.

It will be understood that the amounts of each of the compounds in the mixture may be chosen based on the desired final cement composition. The cement industry frequently reports the composition of cement as a percentage of the raw material oxides as $CaO$, $SiO_2$, $Al_2O_3$, and $Fe_2O_3$ instead of as the final compounds formed. For example, for a product containing multiple at least one oxides the major product percentages may be about 45% to 67% $CaO$, 18% to 41% $SiO_2$, 0% to 14% $Al_2O_3$, and 0% to 5% $Fe_2O_3$ of one or combinations of these. In addition, the single compounds of the major phases may be produced and as such have their product composition fixed by the chemical formula of the compound. For example, $C_3S$ comprises 74% $CaO$ and 26% $SiO_2$, $C_2S$ comprises 65% $CaO$ and 35% $SiO_2$, $C_3A$ comprises 62% $CaO$ and 38% $Al_2O_3$, and $C_4AF$ comprises 46% $CaO$, 21% $Al_2O_3$, and 33% $Fe_2O_3$.

In some examples, at least one of the compounds in the mixture may be a compound that is not completely soluble in a solution containing the mixture of compounds. For example, one of the compounds may be partially or completely insoluble in the solution. In another example, more than one of the compounds may be partially or completely insoluble in the solution. In yet another example, all of the compounds may be partially or completely insoluble in the solution. In other examples, the compounds in the mixture may be provided as homogenous or non-homogeneous mixtures. For example, the mixture of compounds may be provided in an aqueous or non-aqueous solution as well as homogeneous and non-homogeneous mixtures. As discussed above, at least one of the compounds may not be partially or completely soluble in the solution. However, the presence of such compounds does not prevent the formation of the desire oxide. For example, silicon may be provided in the form of silica fume that may not be soluble in a solution containing the mixture of compounds. In this example, the compounds containing the required calcium, aluminum, and/or iron may be mixed in solution, the fuel source added, and the silica fume subsequently added to the mixture prior to heating. It will be understood that the mixture of compounds and the fuel source may be provided in any suitable manner and in any suitable order. It will be further understood that the solution may be any suitable solution. In some examples, soluble compounds may be dissolved in various acidic solutions including but not limited to nitric acid, acetic acid, citric acid, other acids or combinations thereof.

Any suitable fuel source may be used. For purposes of defining and describing the present invention, the term "fuel source" shall be understood as referring to any compound that may be used to provide fuel for a combustion reaction that occurs upon heating the mixture of compounds. For example, the fuel source may comprise urea, glycine, carbohydrates, petroleum products, and/or hydrogen. In some examples, the fuel source is chosen to assist in gelling of the mixture after the mixture is heated to remove water, when such a heating step is performed. In other examples, the fuel source is not chosen to assist in gelling of the mixture after the mixture is heated to remove water, when such a heating step is performed. Any suitable amount of the fuel source may be used, and one having skill in the art would be able to choose the fuel source and amount to provide a desired combustion reaction. In some examples, urea is used as the fuel source and the urea may be provided in an amount of about 2.5:1 by weight of urea to product ratio to about 3.6:1 by weight of urea to product ratio.

The fuel source may also include additional additives. For example, the additive fuel source may include additives that can aid in foaming or combustion. Examples of suitable additives include, but are not limited to, acetic acid and citric acid, or combinations thereof.

Any suitable oxidizer may be used. For purposes of defining and describing the present invention, the term "oxidizer" shall be understood as referring to any suitable source of oxygen for the combustions reaction. Examples of suitable oxidizers include, but are not limited to, nitric acid, oxygen, air, calcium nitrate, ammonium nitrate, and any other suitable oxygen containing compound.

Figure 2:
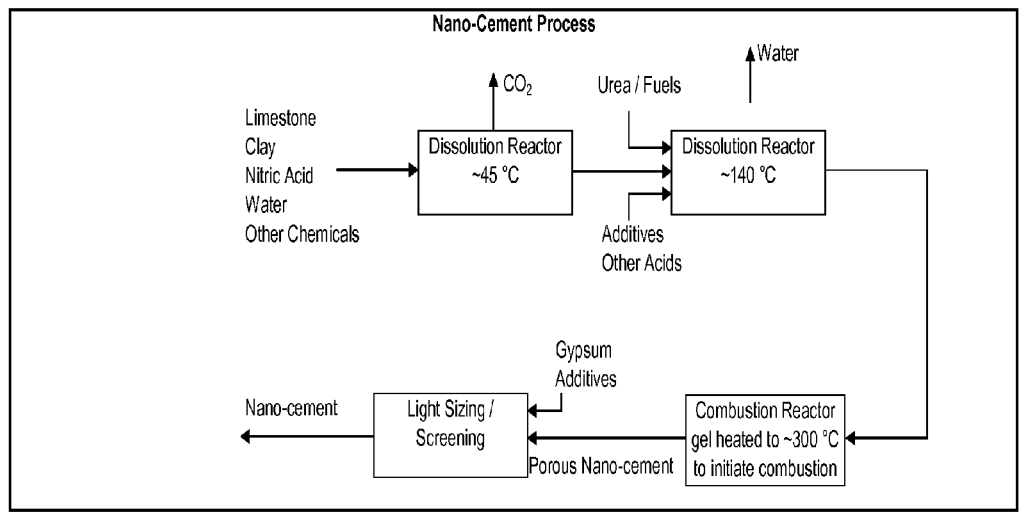
FIG. 2 is a schematic illustration of an exemplary method of preparing cement compositions in accordance with embodiments of the present invention.

The step of heating the mixture of compounds, the oxidizer, and the fuel source may be performed in any suitable manner and at any suitable temperature or temperatures. For example, the mixture of compounds, oxidizer, and/or fuel source may be initially heated to remove water and then heated to a temperature sufficient to ignite the mixture such that a combustion reaction occurs. In some examples, the mixture may be allowed to gel after the initial heating step to remove water and before the step of heating until the mixture is heated to ignition. In other examples, the mixture may be heated until the mixture foams and to a temperature sufficient to ignite the mixture such that a combustion reaction occurs. One such exemplary schematic approach is illustrated in FIG. 2. The foaming may keep non-dissolved materials uniformly suspended and mixed. It will be understood that the foaming does not necessarily have to occur.

Once the mixture is heated to a temperature sufficient to initiate the combustion reaction, the temperature rises rapidly and reactions occur to form the at least one oxide. It will be understood that the amounts of each oxide can be controlled depending on the ratio of the mixture of compounds and the temperature achieved during combustion. Any suitable temperature may be used to ignite the mixture. For example, the ignition temperature may be less than about 300° C., about 300° C., about 400° C., about 500° C., about 600° C., or more than about 600° C. The mixture may be heated to the ignition temperature in any suitable manner. For example, the mixture may be placed in or on a heat source that is slowly raised to the ignition temperature or that is quickly raised to the ignition temperature. In another example, the mixture may be placed in or on a heat source that is already at or above the ignition temperature. It will be understood that the particular temperature for igniting the mixture will vary based on the particular mixture of compounds, amounts of the compounds, the particular fuel source, the amount of the particular fuel source, the particular oxidizer, the amount of particular oxidizer and the presence of any additional additives. It will be further understood that the particular manner of heating is merely a matter of convenience and any suitable method of heating may be used.

Once combustion occurs, the at least one oxide or mixture of oxides comprises nanoscale oxide particles. The nanoscale oxide particles may be of any suitable size. For example, the oxide particles may have an average particle size of less than about 600 nm, less than about 500 nm, less than about 400 nm, less than about 300 nm, less than about 200 nm, less than about 100 nm, and less than about 20 nm, or combinations thereof. It will be understood that the oxide particles may have any suitable range of size distributions.

The particles may be loosely aggregated, and the particles may be further processed in any suitable manner. For example, the particles may be ground or screened. In some examples, the particles may be ground or screened so that they pass through a sieve having a mesh size of from about 40 to about 400, or from about 100 to about 325. In another example, gypsum may be added to the at least one oxide in any suitable amount.

In yet further examples, the at least one oxide may be used to replace Ordinary Portland Cement particles in any suitable manner and in any suitable amount, including entirely replacing Ordinary Portland Cement in such applications where it is used. Examples of such replacement amounts, include but are not limited to, from about 2% by weight of a mixture containing mainly Ordinary Portland Cement and the at least one oxide to entirely replacing Ordinary Portland Cement such that the at least one oxide comprises 100% of the cement. In some examples, less than about 2% by weight of the at least one oxide may be used as a replacement for Ordinary Portland Cement. For purposes of describing and defining the present invention, the term "Ordinary Portland Cement" shall be understood as referring to a cement having particles of at least one of tricalcium silicate ("$C_3S$"), dicalcium silicates ("$C_2S$"), tricalcium aluminate ("$C_3A$"), and tetracalcium aluminoferrite ("$C_4AF$"), or combinations thereof, and the particles having an average particle size of greater than about 5 μm. In other examples, the at least one oxide may be added to any suitable concrete composition in any suitable amount.

In yet other examples, the at least one oxide may be used to replace other cementitious particles in any suitable manner and in any suitable amount, including entirely replacing other cementitious particles in such applications where it is used. Examples of such replacement amounts, include but are not limited to, from about 2% by weight of a mixture containing mainly other cementitious particles and the at least one oxide to entirely replace other cementitious particles such that the at least one oxide comprises 100% of the cement. In some examples, less than about 2% by weight of the at least one oxide may be used as a replacement for other cementitious particles. For purposes particles materials" shall be understood as referring to a cement having aggregate particles that are not classified as Ordinary Portland Cement and the particles having an average particle size of greater than about 5 μm.

The cement compositions of the present invention may exhibit increased surface areas in comparison to Ordinary Portland Cement. In some examples, surface areas from about 2 to about 10 times greater than Ordinary Portland Cement are achieved. In addition, the cement compositions of the present invention may exhibit increased strength in comparison to Ordinary Portland Cement or when used as a replacement to Ordinary Portland Cement. In cases where the at least one oxide cement compositions are used as a replacement for Ordinary Portland Cement in mortar or concrete formulations, it will be understood that the cement compositions may be used in any suitable amounts in the range of about 2 to about 100% by weight.

The present invention will be better understood by reference to the following examples which are offered by way of illustration not limitation.

EXAMPLES

Example 1

Figure 3:
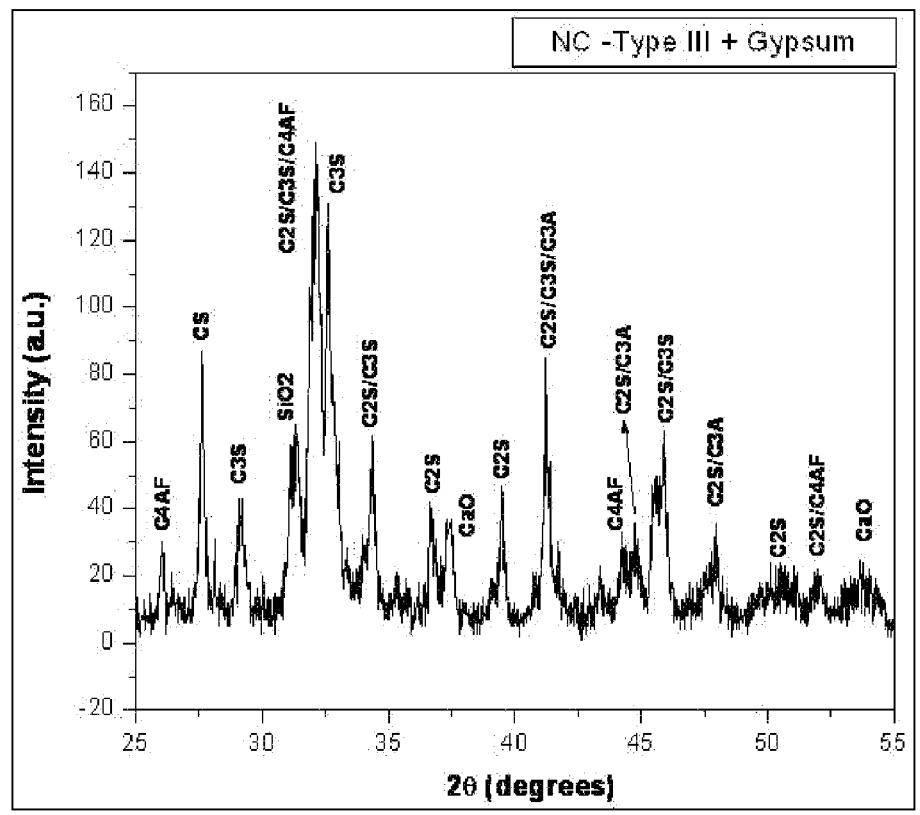
FIG. 3 is a XRD pattern of a cement composition in accordance with embodiments of the present invention.
Figure 4:
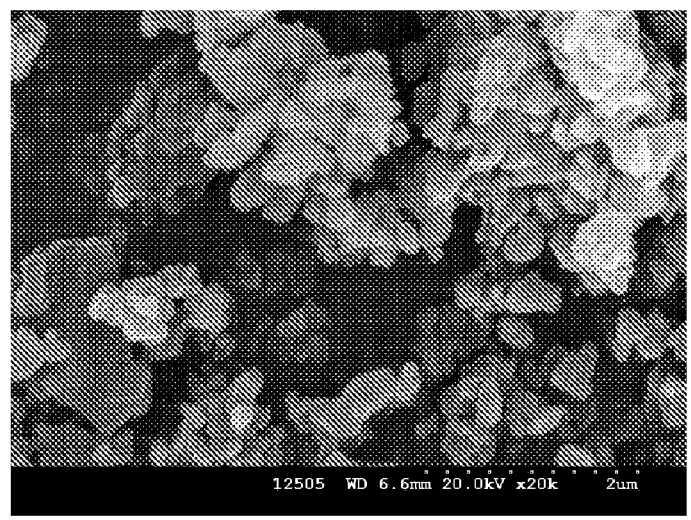
FIG. 4 is a SEM of a cement composition in accordance with embodiments of the present invention.
Figure 5:
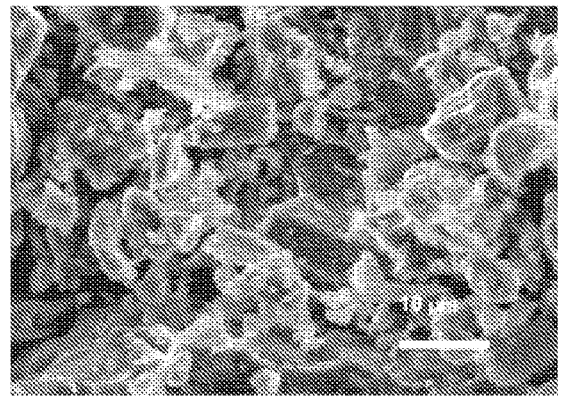
FIG. 5 is a SEM of Ordinary Portland Cement.

Calcium carbonate (365 g) was dissolved in nitric acid (677 g). To this solution, aluminum nitrate (123 g), iron nitrate (44 g), and urea (1080 g) were added and heated until dissolved. Then silica fume (134 g) was added to the solution and finally 17 grams each of citric acid and acetic acid were added. The solution was heated until all the water was evaporated and the resulting slurry was transferred into an oven heated to 500° C. The solution foamed and combusted resulting in a loosely aggregated product with a yield of 320 grams. The product was ground and analyzed by XRD to identify the composition. The oxide product comprised CS, $C_2S$, $C_3S$, CaO, $C_4AF$, and $C_3A$ as shown in FIG. 3. A SEM was also completed to determine the particle size. As shown in FIG. 4, the primary particle sizes of the nano-cement were approximately 200 to 500 nm. FIG. 5 illustrates an SEM of Ordinary Portland Cement, and it can be seen that the average particle size is greater than about 5 μm.

Example 2

The oxide composition from example 1 was mixed with 5% gypsum and ball milled to break up the aggregates so that it passed through a 200 mesh sieve. It was then mixed with sand, silica fume, water and Ordinary Portland Cement in various amounts to determine the effect of compressive strength for the different compositions per ASTM C109.

To document and compare the setting time of the at least one oxide containing compositions produced to those of standard or Ordinary Portland Cement (OPC), the procedures outlined in ASTM C-191, "Test Method for Time of Setting of Hydraulic Cement by Vicat Needle," were followed. This procedure consisted of mixing 200 grams of cement or blended cement, with 95 grams of water, placing the paste in the appropriate support or container and recording the elapsed time from addition of water to the time when the Vicat needle does not sink visibly into the paste. For each experimental test, a standard sample of OPC was prepared for a direct comparison.

Figure 6:
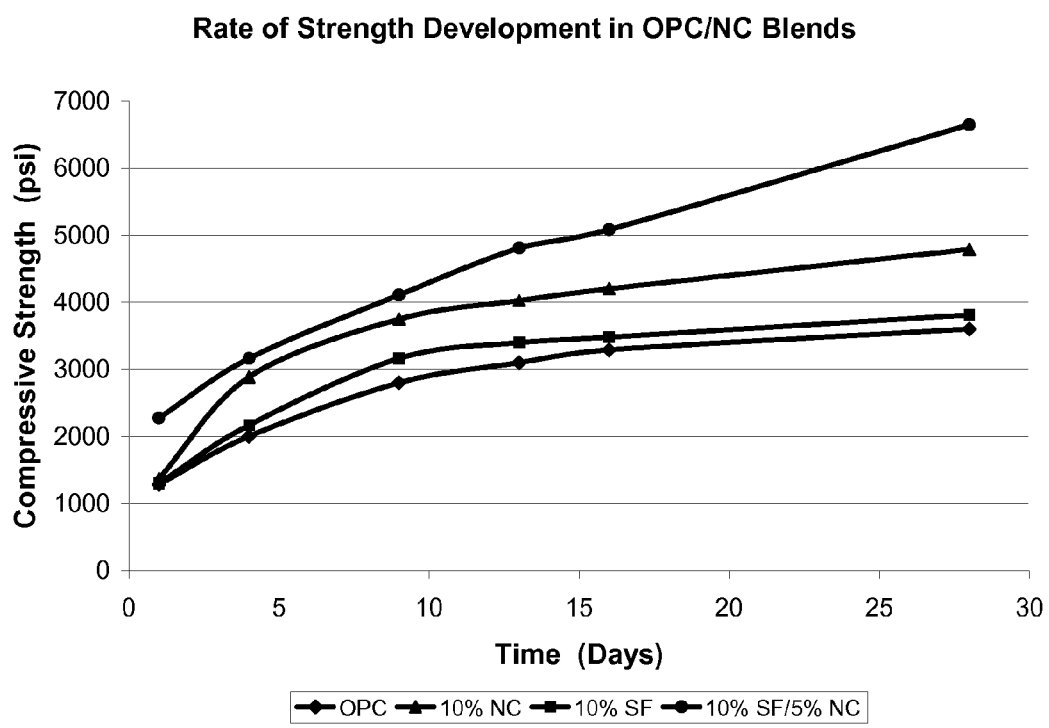
FIG. 6 is a chart of compressive strength of various cement/sand mortars in accordance with embodiments of the present invention.

In all cases, 73.3 parts of sand were mixed with 26.7 parts of total cementitious materials while maintaining the water to cement ratio at 0.485. Mortar cylinders were made and stored wet. The percent of relative compressive strength for each composition was measured as a function of time. Sample 4 consistently demonstrated higher compressive strength, and the rate strength development did not slow down like the other samples during the entire 28 day testing. The compositions and strength results are given in Table 2 and a chart is shown in FIG. 6.

TABLE 2

| Sample No. | % Total OPC Wt % | % Total At least one oxide Wt % | % Total Silica Fume Wt % | % Relative Compressive Strength Per Each Timeframe | | | | |
|---|---|---|---|---|---|---|---|---|
| | | | | 1 Day | 4 Days | 9 Days | 14 Days | 28 Days |
| 1 | 100 | 0 | 0 | 100 | 100 | 100 | 100 | 100 |
| 2 | 90 | 0 | 10 | 102 | 109 | 113 | 110 | 106 |
| 3 | 90 | 10 | 0 | 107 | 145 | 134 | 130 | 133 |
| 4 | 85 | 5 | 10 | 178 | 153 | 147 | 155 | 185 |

Example 3

Figure 7:
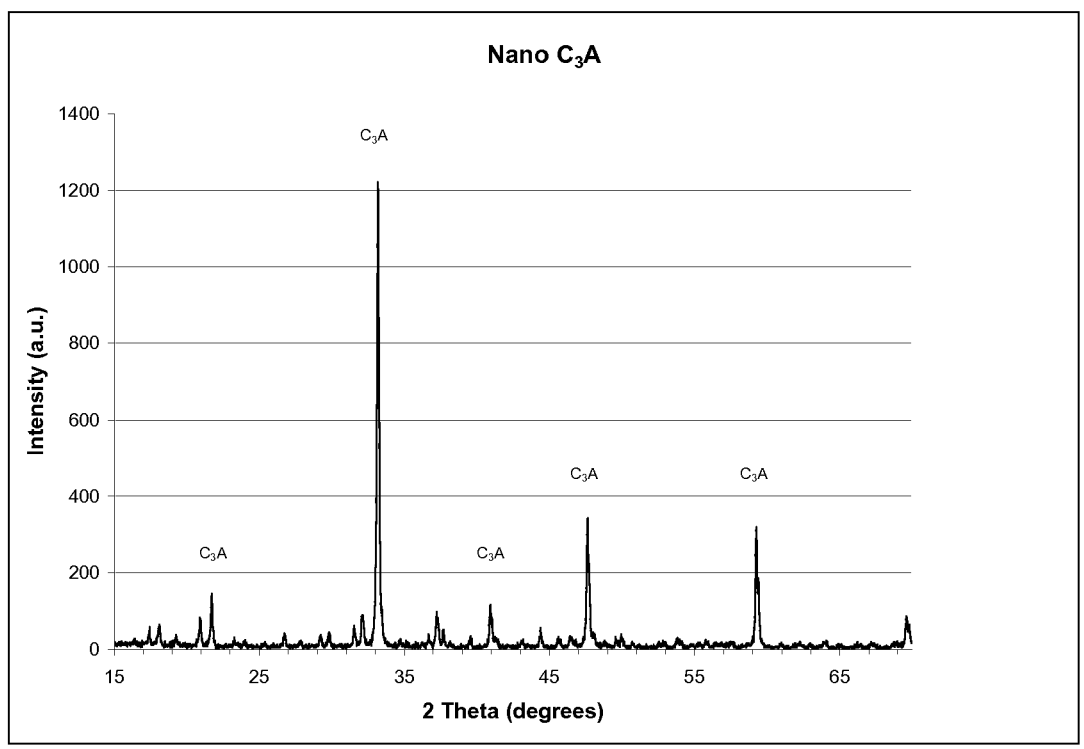
FIG. 7 is a XRD pattern of a cement composition in accordance with embodiments of the present invention.

In this example, it is shown that the single compound $C_3A$ may be produced. Calcium carbonate (202 g) was dissolved in nitric acid (372 g). To this solution, aluminum nitrate (506 g) and urea (546 g) were added and heated until dissolved. The solution was heated until all the water was evaporated and then 9.7 grams each of citric and acetic acid were added and the resulting slurry was transferred into an oven heated to 500° C. The solution foamed and combusted resulting in a loosely aggregated product with a yield of 162 grams. The product was ground and analyzed by XRD. The product comprised primarily $C_3A$ as shown in FIG. 7.

Example 4

Figure 8:
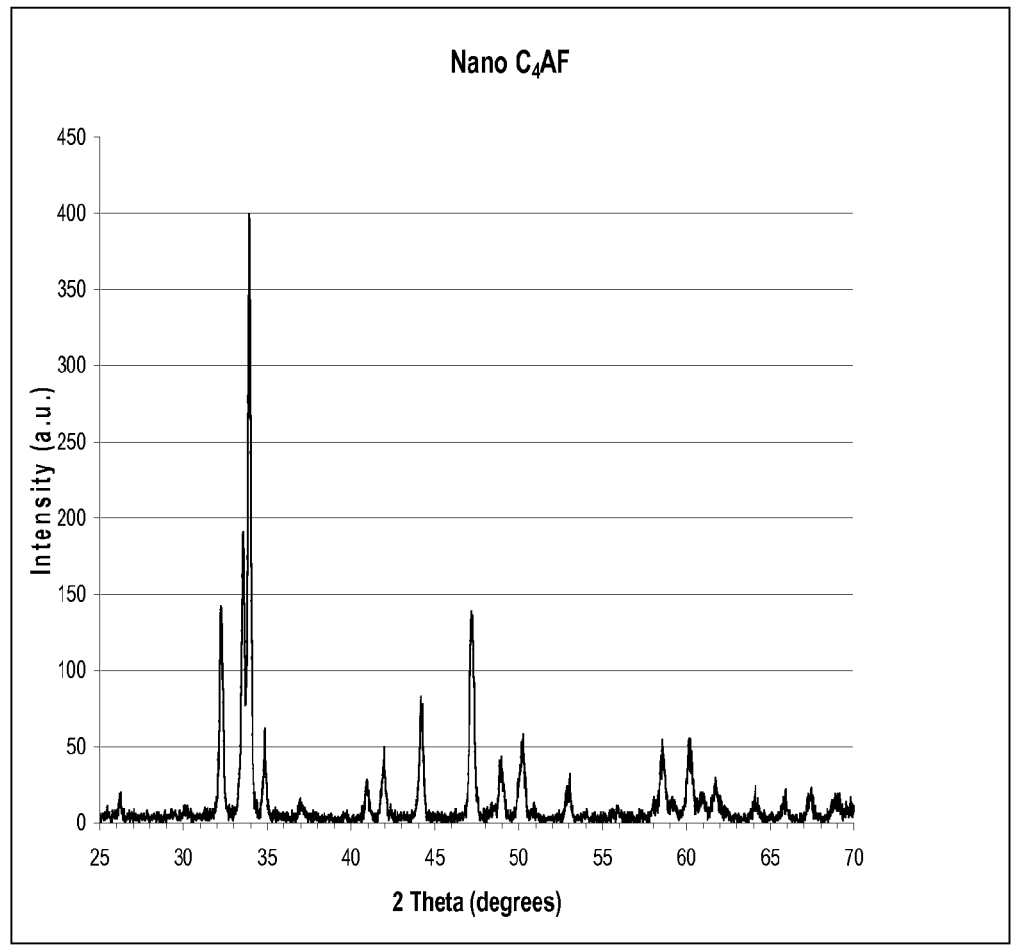
FIG. 8 is a XRD pattern of a cement composition in accordance with embodiments of the present invention.

In this example, it is shown that the single compound $C_4AF$ may be produced. Calcium carbonate (206 g) was dissolved in nitric acid (362 g). To this solution, aluminum nitrate (386 g), iron nitrate (416 g), and urea (643 g) were added and heated until dissolved. The solution was heated until all the water was evaporated and then 9.5 grams each of citric and acetic acid were added and the resulting slurry was transferred into an oven heated to 500° C. The solution foamed and combusted resulting in a loosely aggregated product with a yield of 225 grams. The product was ground and analyzed by XRD. The product comprised primarily $C_4AF$ as shown in FIG. 8

Example 5

Figure 9:
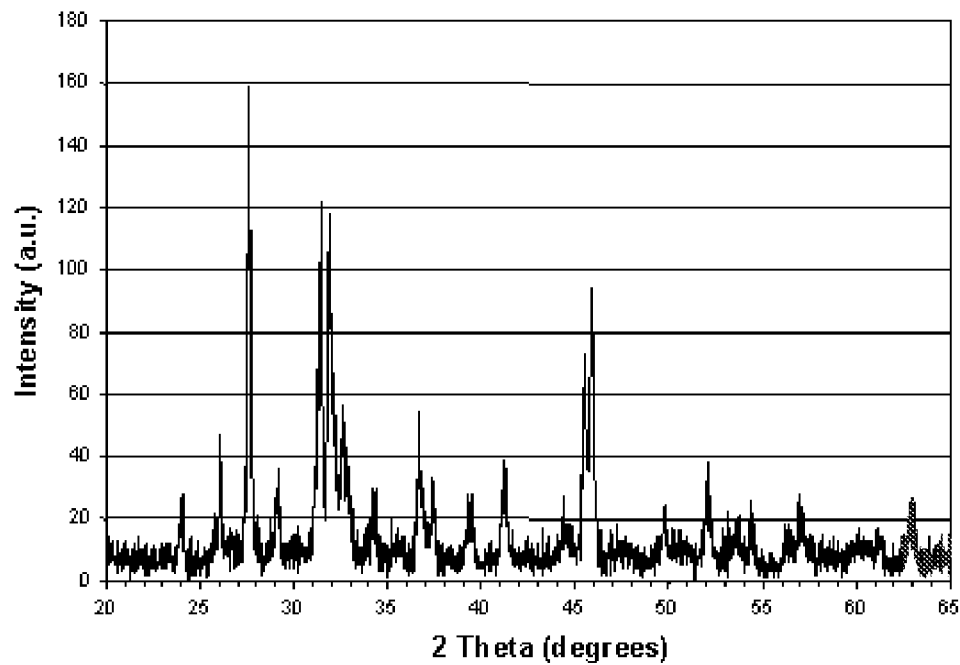
FIG. 9 is a XRD pattern of a cement composition in accordance with embodiments of the present invention.

In this example, it is shown that mined materials such as clay may be used to produce a desired product which is similar to the product in example 1. In this example, the clay provides the source for $SiO_2$, $Al_2O_3$, and $Fe_2O_3$. Calcium carbonate (100 g) was dissolved in nitric acid (186 g). To this solution, clay (60 g) and urea (400 g) were added and heated to remove the water. Next, 5.4 grams each of acetic acid and citric acid were added. The resulting slurry was transferred into an oven heated to 500° C. The solution foamed and combusted resulting in a loosely aggregated product with a yield of 100 grams. The product was ground and analyzed by XRD and is shown in FIG. 9. The product was determined to have a similar composition to that from example 1.

Example 6

Experiments were performed using both reagent grade raw materials and mined raw materials. For reagent grade experiments, calcium carbonate ($CaCO_3$), nitric acid ($HNO_3$), aluminum nitrate [$Al(NO_3)_3 \cdot 9H_2O$], iron nitrate [$Fe(NO_3)_3 \cdot 9H_2O$], silica fume ($SiO_2$), and urea [$CO(NH_2)_2$] were used to synthesize $C_2S$, $C_3S$, $C_3A$, $C_4AF$ individual phases, as well as samples containing all four phases. For the mined raw material experiments, limestone, clay, nitric acid, and urea were used to synthesize cement products similar to the reagent grade products.

In an exemplary experiment, reagent grade $CaCO_3$ powder was dissolved in a beaker containing dilute $HNO_3$ and stirred until a clear solution was obtained. Next, $Al(NO_3)_3 \cdot 9H_2O$ and $Fe(NO_3)_3 \cdot 9H_2O$ were added as necessary and dissolved. Urea was then added to the reaction mixture and the solution was heated. Once all the urea was dissolved, silica fume ($SiO_2$) was added. In addition acetic acid and citric acid were sometimes added depending on the experimental formulation. The solution was mixed and stirred on hot plate to reduce the volume (free water). Once the solution was heated to the expected zero percent water level, the slurry was transferred to a stainless steel container where it was allowed to cool and gel. The gel was then placed in a kiln and heated to combustion.

In other examples, mined raw materials such as limestone were first dissolved in nitric acid, followed by the addition of other soluble ingredients, then the urea, followed by the remaining insoluble powders (silica sources, clays, etc.), heating to remove all water, gelling in stainless reactor pan, followed by heating to combustion was performed.

The experiments also included measuring the temperature profile during heating to determine temperature of dehydration, foaming, auto ignition temperature, and the extent of the exothermic reaction; performing a XRD analysis to determine the types of cement phases formed; measuring surface area and particle size on select samples; DTA on select compositions; checking the ability of the ground paste to form a cementatious, hydraulic bond; and using the ground product to make small cement-mortar sand samples for measuring the rate of compression strength development and cement setting time.

Compositions and some results are shown in the following tables.

TABLE 3

| | Formula | | | | |
|---|---|---|---|---|---|
| | NC-0001 | NC-0005 | NC-0003 | NC-0004 | NC-0006 |
| Description | Reagent Grade | Limestone Silica Fume High Ca | Limestone Silica Fume Med Ca | Limestone Silica Fume Low Ca | Limestone Fly Ash F High Ca |
| Calcium Carbonate | 12.3 | 0.0 | 0.0 | 0.0 | 0.0 |
| Limestone | 0.0 | 17.6 | 15.7 | 14.5 | 17.5 |
| Silica Fume | 4.5 | 1.0 | 2.8 | 4.1 | 0.0 |
| Fly Ash Class F | 0.0 | 0.0 | 0.0 | 0.0 | 1.0 |
| Fly Ash Class C | 0.0 | 0.0 | 0.0 | 0.0 | 0.0 |
| Urea | 36.5 | 35.7 | 37.4 | 39.2 | 35.8 |

TABLE 3-continued

|  | Formula | | | | |
| --- | --- | --- | --- | --- | --- |
|  | NC-0001 | NC-0005 | NC-0003 | NC-0004 | NC-0006 |
| Nitric Acid | 22.9 | 28.0 | 25.5 | 23.1 | 27.9 |
| Acetic Acid | 0.6 | 0.7 | 0.7 | 0.6 | 0.7 |
| Citric Acid | 0.6 | 0.7 | 0.7 | 0.6 | 0.7 |
| Water | 16.9 | 16.3 | 17.2 | 17.9 | 16.4 |
| Aluminum Nitrate | 4.2 | 0.0 | 0.0 | 0.0 | 0.0 |
| Iron Nitrate | 1.5 | 0.0 | 0.0 | 0.0 | 0.0 |
| Target CaO | 56 | 60 | 51 | 45 | 60 |
| Target SiO2 | 36 | 23 | 34 | 41 | 20 |
| Target Al2O3 | 4.6 | 5.7 | 4.8 | 4.3 | 8.2 |
| Target Fe2O3 | 2.4 | 1.9 | 1.6 | 1.4 | 2.4 |
| Target MgO | 0.0 | 8.4 | 7.1 | 6.3 | 8.4 |
| CaO/SiO2 | 1.6 | 2.6 | 1.5 | 1.1 | 3.0 |
| Surface Area ($m^2/g$) | 3.6 | 6.3 | 6.7 | 6.8 | 5.5 |

TABLE 4

|  | Formula | | | | |
| --- | --- | --- | --- | --- | --- |
|  | NC-0006 | NC-0007 | NC-0008 | NC-0011 | NC-0012 |
| Description | Limestone Fly Ash F High Ca | Limestone Fly Ash F Med Ca | Limestone Fly Ash F Low Ca | Limestone Al, Fe Nitrate | Limestone Fe Nitrate |
| Calcium Carbonate | 0.0 | 0.0 | 0.0 | 0.0 | 0.0 |
| Limestone | 17.5 | 15.6 | 14.3 | 14.5 | 15.1 |
| Silica Fume | 0.0 | 0.0 | 0.0 | 2.6 | 2.7 |
| Fly Ash Class F | 1.0 | 3.0 | 4.4 | 0.0 | 0.0 |
| Fly Ash Class C | 0.0 | 0.0 | 0.0 | 0.0 | 0.0 |
| Urea | 35.8 | 38.0 | 39.3 | 34.8 | 36.2 |
| Nitric Acid | 27.9 | 24.9 | 22.7 | 25.7 | 26.8 |
| Acetic Acid | 0.7 | 0.6 | 0.6 | 0.6 | 0.6 |
| Citric Acid | 0.7 | 0.6 | 0.6 | 0.6 | 0.6 |
| Water | 16.4 | 17.3 | 18.1 | 15.9 | 16.6 |
| Aluminum Nitrate | 0.0 | 0.0 | 0.0 | 3.9 | 0.0 |
| Iron Nitrate | 0.0 | 0.0 | 0.0 | 1.4 | 1.4 |
| Target CaO | 60 | 51 | 45 | 48 | 50 |
| Target SiO2 | 20 | 26 | 30 | 32 | 33 |
| Target Al2O3 | 8.2 | 11.4 | 13.5 | 8.8 | 4.7 |
| Target Fe2O3 | 2.4 | 3.1 | 3.6 | 3.7 | 3.8 |
| Target MgO | 8.4 | 7.2 | 6.4 | 6.6 | 6.9 |
| CaO/SiO2 | 3.0 | 2.0 | 1.5 | 1.5 | 1.5 |
| Surface Area ($m^2/g$) | 5.5 | 3.8 | 4.5 | 3.5 | 3.5 |

TABLE 5

|  | Formula | | | | |
| --- | --- | --- | --- | --- | --- |
|  | NC-0013 | NC-0014 | NC-0015 | NC-0018 | NC-0019 |
| Description | Limestone Al Nitrate | C3A reagent | C3A C2S Limestone | Reagent no Al or Fe | Limestone, Fly Ash C, High Ca |
| Calcium Carbonate | 0.0 | 10.7 | 0.0 | 13.1 | 0.0 |
| Limestone | 14.7 | 0.0 | 15.4 | 0.0 | 16.8 |
| Silica Fume | 2.6 | 0.0 | 0.0 | 4.8 | 0.0 |
| Fly Ash Class F | 0.0 | 0.0 | 0.0 | 0.0 | 0.0 |
| Fly Ash Class C | 0.0 | 0.0 | 0.0 | 0.0 | 1.7 |
| Urea | 35.3 | 28.8 | 33.0 | 38.8 | 36.6 |
| Nitric Acid | 26.2 | 19.6 | 24.5 | 24.2 | 26.8 |
| Acetic Acid | 0.6 | 0.5 | 0.6 | 0.6 | 0.7 |
| Citric Acid | 0.6 | 0.5 | 0.6 | 0.6 | 0.7 |
| Water | 16.1 | 13.2 | 15.1 | 17.9 | 16.7 |
| Aluminum Nitrate | 3.9 | 26.7 | 10.8 | 0.0 | 0.0 |
| Iron Nitrate | 0 | 0 | 0.0 | 0.0 | 0.0 |
| Target CaO | 49 | 62 | 57.0 | 60.4 | 60.0 |
| Target SiO2 | 33 | 0 | 14.0 | 38.8 | 18.1 |
| Target Al2O3 | 8.9 | 38 | 18.8 | 0.0 | 7.8 |
| Target Fe2O3 | 1.5 | 0 | 1.8 | 0.0 | 2.7 |
| Target MgO | 6.8 | 0 | 7.9 | 0.0 | 8.3 |
| CaO/SiO2 | 1.5 | NA | 4.1 | 1.6 | 3.3 |
| Surface Area ($m^2/g$) | 3.0 | 1.9 | 2.8 | 6.5 | 6.1 |

TABLE 6

| Description | NC-0020 Limestone, Fly Ash C, Med Ca | NC-0021 Limestone, Fly Ash C, Low Ca | NC-0022 Limestone, Fly Ash C, Low Ca |
|---|---|---|---|
| Calcium Carbonate | 0.0 | 0.0 | 0.0 |
| Limestone | 13.6 | 11.1 | 11.1 |
| Silica Fume | 0.0 | 0.0 | 0.0 |
| Fly Ash Class F | 0.0 | 0.0 | 0.0 |
| Fly Ash Class C | 5.0 | 7.6 | 7.6 |
| Urea | 40.1 | 43.0 | 36.5 |
| Nitric Acid | 21.7 | 17.7 | 26.7 |
| Acetic Acid | 0.6 | 0.5 | 0.7 |
| Citric Acid | 0.6 | 0.5 | 0.7 |
| Water | 18.4 | 19.6 | 16.7 |
| Aluminum Nitrate | 0.0 | 0.0 | 0.0 |
| Iron Nitrate | 0.0 | 0.0 | 0.0 |
| Target CaO | 51.0 | 45.0 | 45.0 |
| Target SiO2 | 21.4 | 23.7 | 23.7 |
| Target Al2O3 | 10.3 | 11.9 | 12.0 |
| Target Fe2O3 | 3.7 | 4.4 | 4.4 |
| Target MgO | 7.0 | 6.1 | 6.1 |
| CaO/SiO2 | 2.4 | 1.9 | 1.9 |
| Surface Area (m$^2$/g) | 2.6 | 3.9 | 3.5 |

Figure 10:
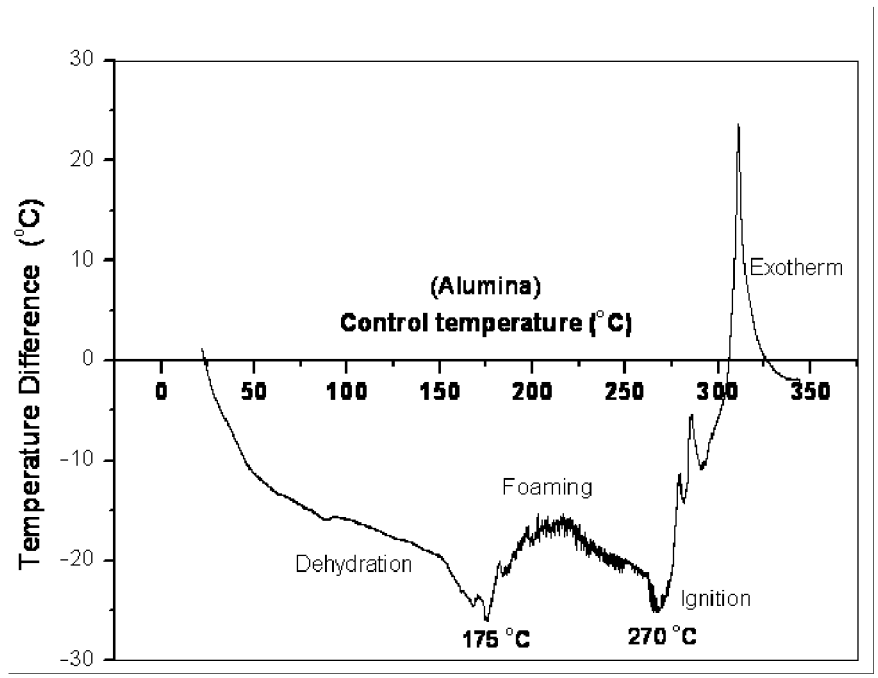
FIG. 10 is a DTA curve showing changes occurring during heating in accordance with embodiments of the present invention.

In addition, FIG. 10 shows an exemplary DTA curve depicting the different stages of the combustion reaction. Initially, any excess water is driven off up to the melting point of urea which is 132° C. After 132° C., the sample starts foaming, then thickens until 270-300° C., at which time combustion is initiated.

The present invention should not be considered limited to the specific examples described above, but rather should be understood to cover all aspects of the invention. Various modifications, equivalent processes, as well as numerous structures and devices to which the present invention may be applicable will be readily apparent to those of skill in the art.

The invention claimed is:

1. A method for making cement compositions, comprising:
providing a mixture of compounds containing the required calcium, silicon, aluminum, and iron to provide at least one of tricalcium silicate, dicalcium silicate, tricalcium aluminate, tetracalcium alumino ferrite, other calcium silicates, aluminates, ferrites, and silicates or combinations thereof;
adding a fuel source and an oxidizer to the mixture of compounds; and
heating the mixture of compounds, the fuel source, and the oxidizer such that the mixture of compounds, the fuel source, and the oxidizer gels, foams, and subsequently ignites to form the at least one tricalcium silicate, dicalcium silicate, tricalcium aluminate, and tetracalcium aluminoferrite, or combinations thereof, wherein the at least one tricalcium silicate, dicalcium silicate, tricalcium aluminate, tetracalcium alumino ferrite, other calcium silicates, aluminates, ferrites, and silicates, or combinations thereof each have a particle size of less than about 600 nm.

2. The method as claimed in claim 1 wherein the mixture of compounds containing the required calcium, silicon, aluminum, and iron comprises at least one of limestone, clay, silica fume, blast furnace slag, and fly ash, or combinations thereof.

3. The method as claimed in claim 1 wherein the step of providing a mixture of compounds comprises providing a mixture of compounds containing the required calcium, silicon, aluminum, and iron to provide two or more of tricalcium silicate, dicalcium silicate, tricalcium aluminate, tetracalcium alumino ferrite, other calcium silicates, aluminates, ferrites, and silicates, or combinations thereof.

4. The method as claimed in claim 1 wherein the step of adding a fuel source comprises adding urea.

5. The method as claimed in claim 1 wherein the step of heating comprises heating the mixture of compounds, the fuel source, and the oxidizer to about 300° C.

6. The method as claimed in claim 1 further comprising providing at least one acid prior to the step of heating.

7. The method as claimed in claim 6 wherein the at least one acid is selected from nitric acid, citric acid, and acetic acid, or combinations thereof.

* * * * *